United States Patent
Wang et al.

(10) Patent No.: US 9,917,845 B2
(45) Date of Patent: Mar. 13, 2018

(54) LINK DISCOVERY METHOD AND APPARATUS

(71) Applicant: Huawei Technologies Co., Ltd., Shenzhen (CN)

(72) Inventors: Cheng Wang, Nanjing (CN); Kang Zi, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 14/864,464

(22) Filed: Sep. 24, 2015

(65) Prior Publication Data

US 2016/0014142 A1  Jan. 14, 2016

Related U.S. Application Data

(63) Continuation of application No. PCT/CN2014/072886, filed on Mar. 5, 2014.

(30) Foreign Application Priority Data

Apr. 3, 2013  (CN) .......................... 2013 1 0115610

(51) Int. Cl.
*H04L 29/06* (2006.01)
*H04L 12/64* (2006.01)
(Continued)

(52) U.S. Cl.
CPC ........ *H04L 63/105* (2013.01); *H04L 12/4625* (2013.01); *H04L 12/6418* (2013.01);
(Continued)

(58) Field of Classification Search
CPC . H04L 63/105; H04L 63/0876; H04L 63/162; G06F 21/445
See application file for complete search history.

(56) References Cited

U.S. PATENT DOCUMENTS

| 8,514,712 B1* | 8/2013 | Aswadhati .......... H04L 12/6418 370/235 |
| 2004/0044771 A1* | 3/2004 | Allred ................... H04L 29/125 709/227 |

(Continued)

FOREIGN PATENT DOCUMENTS

| CN | 101207475 A | 6/2008 |
| CN | 101945245 A | 1/2011 |

(Continued)

OTHER PUBLICATIONS

"IEEE Standard for Local and metropolitan area networks—Station and Media Access Control Connectivity Discovery," IEEE Std. 802.1AB-2009, pp. i-190, Institute of Electrical and Electronics Engineers, New York, New York (Sep. 17, 2009).

*Primary Examiner* — David J Pearson
(74) *Attorney, Agent, or Firm* — Leydig, Voit & Mayer, Ltd.

(57) ABSTRACT

The present application discloses a link discovery method and apparatus. The method includes: when a network device receives a first LLDP packet sent by a directly connected device, determining a security level of the directly connected device according to an authentication TLV; if the security level of the directly connected device is secure, determining a device type of the directly connected device, and sending a second LLDP packet to the directly connected device according to a correspondence between the device type of the directly connected device and a TLV. In the present application, a corresponding TLV is selected according to the device type and sent, which avoids that all types of TLVs are sent to a directly connected device every time, and reduces a possibility of device information leakage. It is ensured that a sent LLDP packet is more proper, and a link overhead is reduced.

14 Claims, 4 Drawing Sheets

(51) Int. Cl.
  *H04L 12/24* (2006.01)
  *H04L 12/46* (2006.01)
  *H04L 12/721* (2013.01)
  *H04L 12/841* (2013.01)

(52) U.S. Cl.
  CPC .......... *H04L 41/0806* (2013.01); *H04L 41/28* (2013.01); *H04L 45/26* (2013.01); *H04L 47/286* (2013.01); *H04L 63/0876* (2013.01); *H04L 63/162* (2013.01); *Y02B 60/43* (2013.01)

(56) References Cited

U.S. PATENT DOCUMENTS

| | | | |
|---|---|---|---|
| 2008/0141359 A1* | 6/2008 | Lee | H04L 63/0227 726/13 |
| 2009/0116404 A1* | 5/2009 | Mahop | H04L 41/0213 370/254 |
| 2010/0241880 A1 | 9/2010 | Wertheimer et al. | |
| 2012/0060209 A1 | 3/2012 | Leu | |
| 2013/0106987 A1 | 5/2013 | Wang et al. | |
| 2014/0215580 A1* | 7/2014 | Behringer | H04L 63/105 726/5 |
| 2015/0207793 A1* | 7/2015 | Mohamed | H04L 63/166 726/6 |

FOREIGN PATENT DOCUMENTS

| | | |
|---|---|---|
| CN | 102684985 A | 9/2012 |
| CN | 103236941 A | 8/2013 |
| WO | WO 2008131680 A1 | 11/2008 |

\* cited by examiner

| Chassis ID TLV | Port ID TLV | Time to Live TLV | Optional TLV | ... | Optional TLV | End of LLDPDU TLV |

FIG. 3

| TLV Type | TLV information string Length | TLV information string |

LINK DISCOVERY METHOD AND APPARATUS

CROSS-REFERENCE TO RELATED APPLICATIONS

This application is a continuation of International Patent Application No. PCT/CN2014/072886, filed on Mar. 5, 2014, which claims priority to Chinese Patent Application No. 201310115610.1, filed on Apr. 3, 2013, both of which are hereby incorporated by reference in their entireties.

TECHNICAL FIELD

The present application relates to the field of network management technologies and, in particular, to a link discovery method and apparatus.

BACKGROUND

With the development of Ethernet technologies, types of network devices are increasingly diverse. How to obtain a topology of devices in an entire network, how to solve a configuration conflict between devices, and how to enable devices of different vendors to discover each other in a network and exchange system and configuration information, have become important issues in network management.

The LLDP (Link Layer Discovery Protocol) provides a neighbor discovery protocol at the data link layer. In the protocol, information of a device, such as main capabilities, a management address, a chassis identifier and a port identifier, is organized into different TLVs (Type-Length-Values), and the TLVs are encapsulated in an LLDPDU (Link Layer Discovery Protocol Data Unit) and distributed to a neighbor directly connected to the device. After receiving the information, the neighbor stores the information in a form of a standard MIB (Management Information Base) for a network management system to query and determine a communication condition of a link. The LLDPDU always starts with a Chassis ID TLV (Chassis Identifier TLV, chassis identifier type-length-value), a Port ID TLV (Port Identifier TLV, port identifier type-length-value) and a Time to Live TLV (a neighbor life cycle type-length-value), and ends with an End of LLDPDU TLV (an end type-length-value). These four TLVs are mandatory TLVs.

To avoid establishing a neighbor relationship with an insecure device, in the LLDP, it is verified, in the following manner, whether a directly connected device is secure. When a first network device receives an LLDPDU sent from a second network device, the first network device checks whether the LLDPDU includes a valid authorization key; if the authorization key does not exist or is invalid, the first network device blocks all encapsulated packets sent by the second network device, to implement a function of preventing an unauthorized second network device from connecting and using a network transmission service provided by the first network device. The authorization key is obtained by adding a password to a MAC (Medium Access Control) address.

In the process of implementing the present application, the inventor finds that at least the following problem exists in the prior art: device information of the first network device may leak in the prior art.

SUMMARY

To solve a problem of device information leakage in the prior art, embodiments of the present application provide a link discovery method and apparatus.

According to a first aspect, an embodiment of the present application provides a link discovery method, including:

in response to a network device receiving a first Link Layer Discovery Protocol LLDP packet sent by a directly connected device, determining a security level of the directly connected device according to an authentication type-length-value TLV in the first LLDP packet, the security level includes either a secure security level or an insecure security level, where the first LLDP packet includes the authentication TLV and a minimum security level TLV, and the minimum security level TLV includes a Chassis ID TLV, a Port ID TLV, a Time to Live TLV, and an End of LLDP Data Unit TLV; and determining a security level of the directly connected device according to the authentication TLV, the security level includes either a secure security level or an insecure security level, where in response to determining that the security level of the directly connected device is the secure security level, determining a device type of the directly connected device according to the first LLDP packet, and sending a second LLDP packet to the directly connected device according to the device type of the directly connected device, where the second LLDP packet includes a TLV corresponding to the device type of the directly connected device.

With reference to the first aspect, in an implementation manner, the method further includes:

in response to determining that the security level of the directly connected device is the insecure security level, sending the first LLDP packet to the directly connected device.

With reference to the first aspect and the foregoing implementation manner, in another implementation manner, before the determining the security level of the directly connected device according to the authentication TLV of the first LLDP packet, the method further includes:

receiving an LLDP packet sent by the directly connected device, and determining whether the received LLDP packet carries an authentication TLV, where where if the LLDP packet carries an authentication TLV, then the LLDP packet is the first LLDP packet; and where if the LLDP packet does not carry an authentication TLV, then the method further comprises sending the first LLDP packet to the directly connected device.

With reference to the first aspect and the foregoing implementation manner, in another implementation manner, the determining the security level of the directly connected device according to the authentication TLV in the first LLDP packet includes:

obtaining a chassis identifier and a port identifier of the directly connected device according to the Chassis ID TLV and the Port ID TLV;

calculating a determining TLV based on the chassis identifier and the port identifier; and determining, by comparing, whether the determining TLV and the authentication TLV are the same, where if the determining TLV and the authentication TLV are the same, determining that the security level of the directly connected device is the secure security level; and, if the determining TLV and the authentication TLV are different, determining that the security level of the directly connected device is the insecure security level.

With reference to the first aspect and the foregoing implementation manner, in another implementation manner, the first LLDP packet further includes a System Capabilities TLV, where the System Capabilities TLV includes a system capabilities field used to describe the device function, and the determining the device type of the directly connected device according to the first LLDP packet includes:

acquiring, according to the system capabilities field in the System Capabilities TLV, a function provided by the directly connected device; and determining the device type of the directly connected device according to the function provided by the directly connected device.

With reference to the first aspect and the foregoing implementation manner, in another implementation manner, before the determining the device type of the directly connected device according to the first LLDP packet, the method further includes:

determining whether the first LLDP packet carries a System Capabilities TLV; and if the first LLDP packet does not carry a System Capabilities TLV, sending the second LLDP packet to the directly connected device, where the TLV in the second LLDP packet includes all types of TLVs; or if the first LLDP packet carries a System Capabilities TLV, determining the device type of the directly connected device according to the System Capabilities TLV.

With reference to the first aspect and the foregoing implementation manner, in another implementation manner, the sending a second LLDP packet to the directly connected device according to the device type of the directly connected device includes:

when the directly connected device is a repeater, sending the second LLDP packet to the directly connected device, where the TLV in the second LLDP packet includes only the minimum security level TLV; or when the directly connected device is a bridge or a router, sending the second LLDP packet to the directly connected device, where the TLV in the second LLDP packet includes all types of TLVs; or when the directly connected device is an Internet protocol telephone, sending the second LLDP packet to the directly connected device, where the TLV in the second LLDP packet includes the minimum security level TLV, a Port Description TLV, a System Name TLV, a System Description TLV, a System Capabilities TLV, a port virtual local area network identifier TLV, and a device power supply capability TLV.

With reference to the first aspect and the foregoing implementation manners, in another implementation manner, before the sending a second LLDP packet to the directly connected device according to the device type of the directly connected device, the method further includes:

encrypting the TLV in the second LLDP packet by using a reversible algorithm.

With reference to the first aspect and the foregoing implementation manners, in another implementation manner, the method further includes:

when a quantity of directly connected devices connected to one port of the network device reaches an upper limit, and a security level of a directly connected device that is newly accessed on the port is secure, deleting at least one directly connected device connected to the port, where a security level of the at least one directly connected device is insecure.

According to a second aspect, an embodiment of the present application further provides a link discovery apparatus, including:

a first determining module, configured to: in response to a network device receiving a first Link Layer Discovery Protocol LLDP packet sent by a directly connected device, determine a security level of the directly connected device according to an authentication TLV in the first LLDP packet, where the security level includes either a secure security level or an insecure security level, where the first LLDP packet includes the authentication TLV and a minimum security level TLV, and the minimum security level TLV includes a Chassis ID TLV, a Port ID TLV, a Time to Live TLV, and an End of LLDP Data Unit TLV;

a second determining module, configured to: in response to the first determining module determining that the security level of the directly connected device is the secure security level, determine a device type of the directly connected device according to the first LLDP packet; and a sending module, configured to send a second LLDP packet to the directly connected device according to the device type of the directly connected device, where the second LLDP packet includes a TLV corresponding to the device type of the directly connected device.

With reference to the second aspect, in an implementation manner, the sending module is further configured to send the first LLDP packet to the directly connected device when the security level of the directly connected device is the insecure security level.

With reference to the second aspect and the foregoing implementation manner, in another implementation manner, the apparatus further includes:

a receiving module, configured to receive an LLDP packet sent by the directly connected device; and a third determining module, configured to determine whether the LLDP packet received by the receiving module carries an authentication TLV, where when the LLDP packet carries an authentication TLV, determine that the LLDP packet is the first LLDP packet; or, when the LLDP packet does not carry an authentication TLV, the sending module is further configured to send the first LLDP packet to the directly connected device.

With reference to the second aspect and the foregoing implementation manner, in another implementation manner, the first determining module includes:

an acquiring unit, configured to obtain a chassis identifier and a port identifier of the directly connected device according to the Chassis ID TLV and the Port ID TLV;

a calculating unit, configured to calculate a determining TLV by using the chassis identifier and the port identifier; and a comparing unit, configured to determine, by comparing, whether the determining TLV and the authentication TLV are the same, where if the determining TLV and the authentication TLV are the same, determine that the security level of the directly connected device is secure; or where if the determining TLV and the authentication TLV are different, determine that the security level of the directly connected device is insecure.

With reference to the second aspect and the foregoing implementation manner, in another implementation manner, the first LLDP packet further includes a System Capabilities TLV, where the System Capabilities TLV includes a system capabilities field used to describe a device function, and the second determining module is configured to acquire, according to the system capabilities field in the System Capabilities TLV, a function provided by the directly connected device, and determine the device type of the directly connected device according to the function provided by the directly connected device.

With reference to the second aspect and the foregoing implementation manner, in another implementation manner, the second determining module is further configured to, before the determining a device type of the directly connected device according to the first LLDP packet, determine whether the first LLDP packet carries a System Capabilities TLV, where when the first LLDP packet carries a System Capabilities TLV, determine the device type of the directly connected device according to the System Capabilities TLV, or where when the first LLDP packet does not carry a System Capabilities TLV, the sending module is further configured to send the second LLDP packet to the directly connected device, where the TLV in the second LLDP packet includes all types of TLVs.

With reference to the second aspect and the foregoing implementation manner, in another implementation manner, the sending module is configured to:

when the directly connected device is a repeater, send the second LLDP packet to the directly connected device, where the TLV in the second LLDP packet includes only the minimum security level TLV; or when the directly connected device is a bridge or a router, send the second LLDP packet to the directly connected device, where the TLV in the second LLDP packet includes all types of TLVs; or when the directly connected device is an Internet protocol telephone, send the second LLDP packet to the directly connected device, where the TLV in the second LLDP packet includes the minimum security level TLV, a Port Description TLV, a System Name TLV, a System Description TLV, a System Capabilities TLV, a port virtual local area network identifier TLV, and a device power supply capability TLV.

With reference to the second aspect and the foregoing implementation manners, in another implementation manner, the apparatus further includes:

an encryption module, configured to encrypt the TLV in the second LLDP packet by using a reversible algorithm.

With reference to the second aspect and the foregoing implementation manners, in another implementation manner, the apparatus further includes:

a management module, configured to: when a quantity of directly connected devices connected to one port of the network device reaches an upper limit, and a security level of a directly connected device that is newly accessed on the port is secure, delete at least one directly connected device connected to the port, where a security level of the at least one directly connected device is insecure.

The technical solutions provided by the embodiments of the present application bring the following benefits:

A security level of a directly connected device is determined, and when the security level of the directly connected device is secure, a device type of the directly connected device is determined, and a TLV corresponding to the device type is selected according to the device type and sent, which avoids that all types of TLVs are sent to a directly connected device every time in the prior art, and reduces a possibility of device information leakage. It is ensured that a sent LLDP packet is more proper, thereby reducing a link overhead and avoiding a problem that a directly connected device cannot perform processing and consequently cannot operate normally.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the embodiments of the present application in detail with reference to the accompanying drawings.

Figure 1:
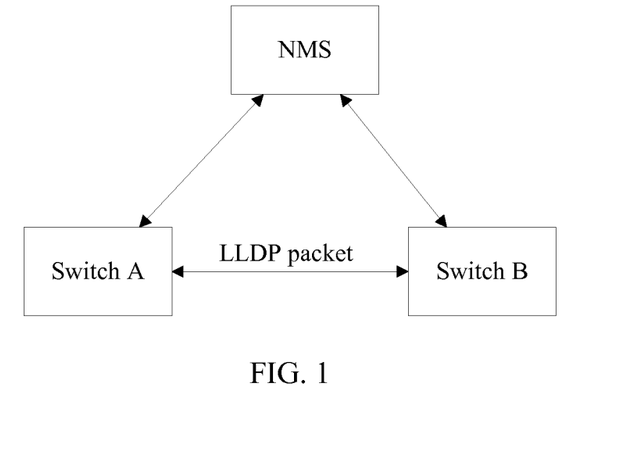
FIG. 1 is a topology diagram of a network management system according to an embodiment of the present application.

For ease of understanding the present application, the following first briefly introduces a network architecture of the embodiments in the present application and a principle of the LLDP with reference to FIG. 1.

In this embodiment of the present application, another network device directly connected to a network device is referred to as a directly connected device of the network device. Each network device exchanges an LLDP packet with a directly connected device of the network device. Referring to FIG. 1, a Switch A (A for short hereinafter) is directly connected to a Switch B (B for short hereinafter), that is, B is a directly connected device of A. A and B exchange an LLDP packet and establish an LLDP neighbor relationship. Each obtains device information of a peer end according to the LLDP packet, and stores the device information in a MIB (Management Information Base) of a local device for an NMS (Network Management System) to query, and perform network topology drawing and network management.

The LLDP packet is an Ethernet packet encapsulated with an LLDPDU. The LLDP packet uses Ethernet II encapsulation or SNAP (SubNetwork Access Protocol) encapsulation.

Figure 2:
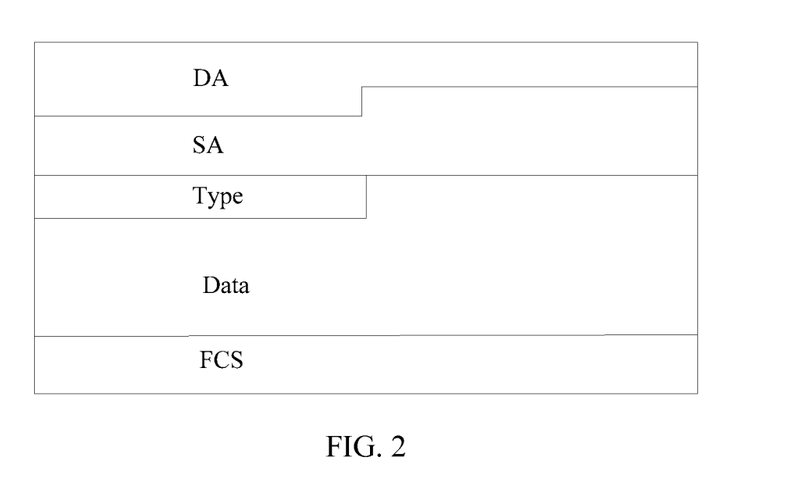
FIG. 2 is a schematic structural diagram of an LLDP packet according to an embodiment of the present application.

The following uses an LLDP packet with Ethernet II encapsulation as an example to describe a structure of the LLDP packet. As shown in FIG. 2, specifically, the LLDP packet includes: a DA (Destination address), an SA (source address), a Type, Data and an FCS (Frame Check Sequence); specifically, the DA refers to a destination MAC (Medium Access Control) address, and the address in the LLDP packet may be a multicast address, for example, 01-80-C2-00-00-0E; the SA refers to a source MAC address, namely, a MAC address of a sending device; the Type refers to a packet type, and the type in the LLDP packet is 0x88CC; the Data is a data subject of the LLDP, namely, an LLDPDU; and the FCS is a frame check sequence.

Figure 3:
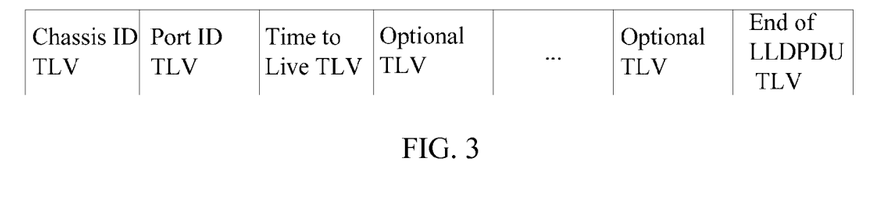
FIG. 3 is a schematic structural diagram of an LLDPDU according to an embodiment of the present application.

Referring to FIG. 3, an LLDPDU includes several TLVs. One LLDPDU always starts with a Chassis ID TLV, a Port ID TLV, and a Time to Live TLV, and ends with an End of LLDPDU TLV. These four TLVs are mandatory TLVs. These four TLVs are minimum security level TLVs in the embodiments of the present application. One LLDPDU may further include other optional TLV, and a device may self-define whether the optional TLV are included in the LLDPDU.

Each TLV is configured to identify corresponding device information, for example, a Chassis ID TLV includes a Chassis ID (Chassis Identifier) of a device, and a Port ID TLV includes a Port ID (Port Identifier).

Figure 4:
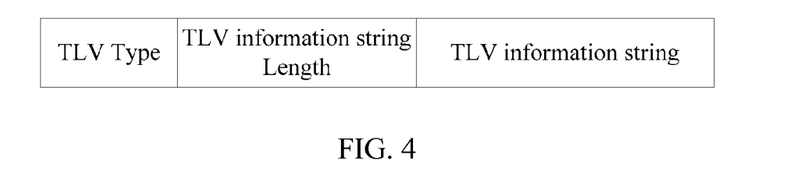
FIG. 4 is a schematic structural diagram of a TLV according to an embodiment of the present application.

Referring to FIG. 4, each TLV includes the following fields: a TLV Type, a TLV information string Length and a TLV information string. Specifically, the TLV Type is the type of the TLV. The type value of each TLV is different from that of another TLV, for example, a type value of the End of LLDPDU TLV is 0. The TLV information string Length indicates a length of a TLV information string field. The first byte of the TLV information string refers to a subtype of the TLV, and the rest bytes are a value of the TLV.

Embodiment 1

Figure 5:
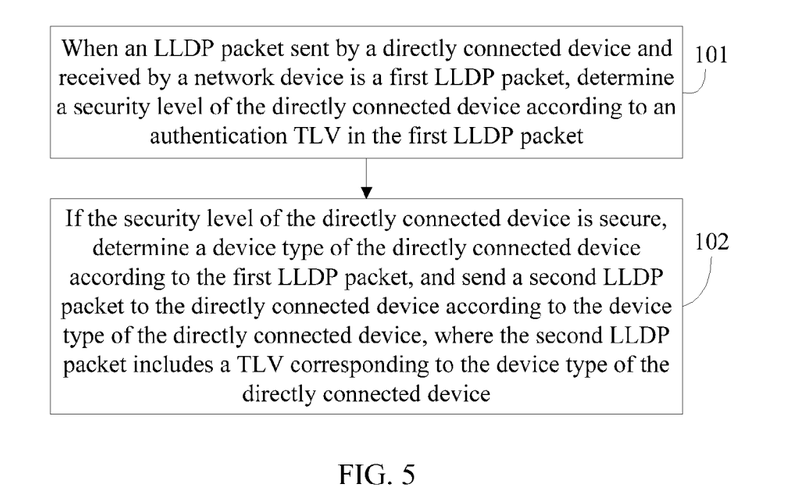
FIG. 5 is a flowchart of a link discovery method according to Embodiment 1 of the present application.

This embodiment of the present application provides a link discovery method. Referring to FIG. 5, the method includes:

101: When an LLDP packet sent by a directly connected device and received by a network device is a first LLDP packet, determine a security level of the directly connected device according to an authentication TLV in the first LLDP packet, where the security level includes "secure" and "insecure", the first LLDP packet includes an authentication TLV and a minimum security level TLV, and the minimum security level TLV includes: a Chassis ID TLV, a Port ID TLV, a Time to Live TLV, and an End of LLDPDU TLV.

102: If the security level of the directly connected device is secure, determine a device type of the directly connected device according to the first LLDP packet, and send a second LLDP packet to the directly connected device according to the device type of the directly connected device, where the second LLDP packet includes a TLV corresponding to the device type of the directly connected device.

In this embodiment of the present application, when a security level of a directly connected device is secure, a device type of the directly connected device is determined, and a TLV corresponding to the device type is selected according to the device type and sent, which avoids that all types of TLVs are sent to a directly connected device every time in the prior art, and reduces a possibility of device information leakage. It is ensured that a sent LLDP packet is more proper, thereby reducing a link overhead and avoiding a problem that a directly connected device cannot perform processing and consequently cannot operate normally.

Embodiment 2

Figure 6:
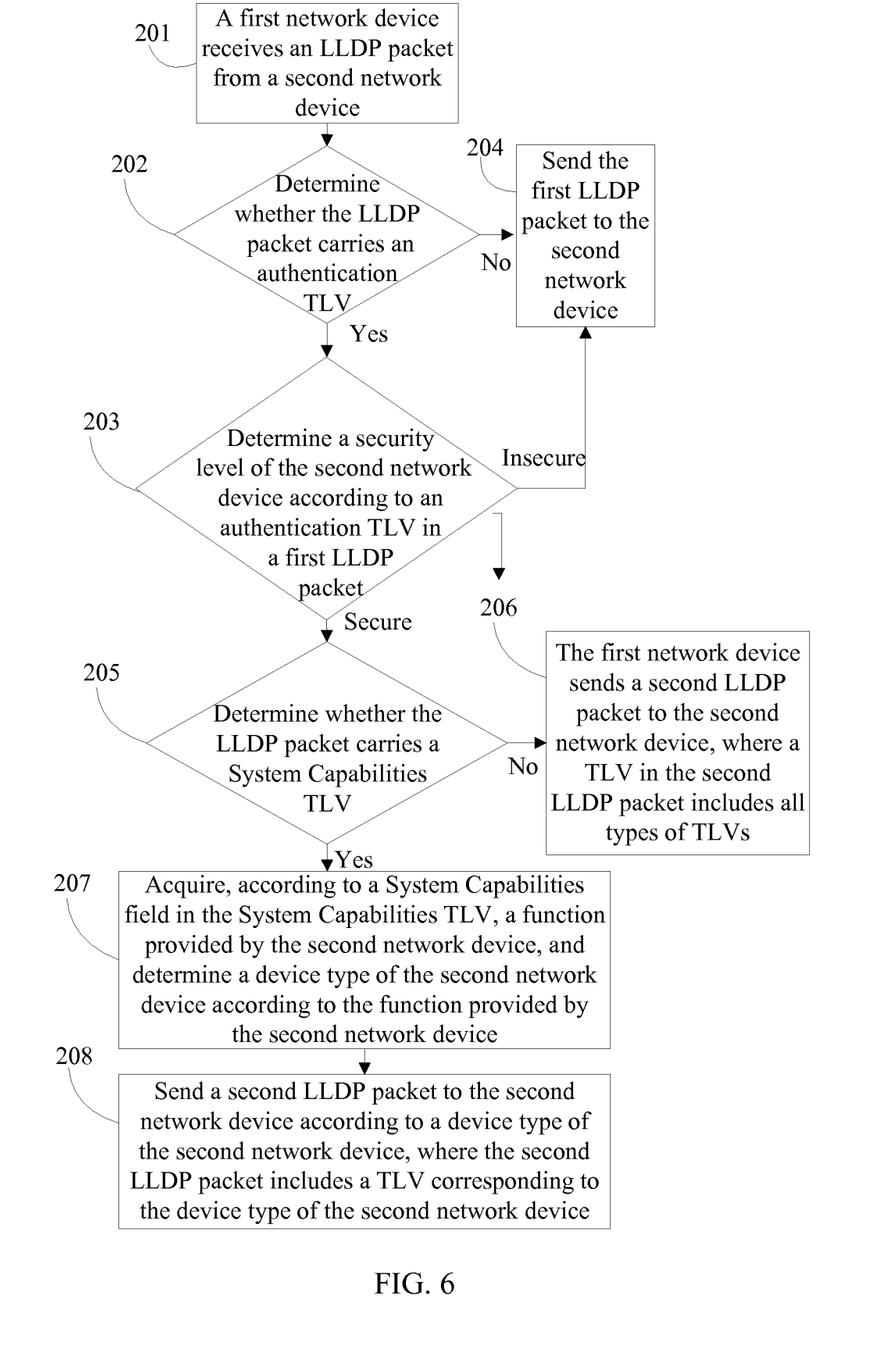
FIG. 6 is a flowchart of a link discovery method according to Embodiment 2 of the present application.

In this embodiment of the present application, a first network device, and a second network device directly connected to the first network device are used as an example, to further describe the link discovery method provided by the present application. Referring to FIG. 6, the method includes:

201: A first network device receives an LLDP packet from a second network device.

The LLDP packet includes several TLVs. As described above, the several TLVs include at least a minimum security level TLV, and the minimum security level TLV includes: a Chassis ID TLV, a Port ID TLV, a Time to Live TLV, and an End of LLDPDU TLV.

202: Determine whether the LLDP packet carries an authentication TLV, where if the LLDP packet carries an authentication TLV, the LLDP packet is a first LLDP packet, and 203 is executed; or if the LLDP packet does not carry an authentication TLV, 204 is executed.

203: Determine a security level of the second network device according to the authentication TLV in the first LLDP packet, and when the security level of the second network device is insecure, execute 204, or when the security level of the second network device is secure, execute 205.

Optionally, in this embodiment, the authentication TLV is obtained by encrypting the Chassis ID and the Port ID of the second network device by the second network device by using an irreversible encryption algorithm (for example, the MD5 (Message Digest Algorithm 5)). It can be easily learnt that the authentication TLV may further be generated according to other information of the second network device, for example, a MAC (Medium Access Control) address.

Specifically, 203 includes:

S1: Obtain a Chassis ID and a Port ID according to the Chassis ID TLV and the Port ID TLV that are carried in the first LLDP packet sent by the second network device;

S2: Calculate a determining TLV according to the Chassis ID and the Port ID.

S3: Determine, by comparing, whether the determining TLV and the authentication TLV are the same, and if the determining TLV and the authentication TLV are the same, determine that the security level of the second network device is secure, or if the determining TLV and the authentication TLV are different, determine that the security level of the second network device is insecure.

It can be easily learnt that in S2, the determining TLV is calculated by using the same irreversible encryption algorithm as that for calculating the authentication TLV by the second network device. The irreversible encryption algorithm may be set on the device before delivery of the device.

204: Send the first LLDP packet to the second network device, where a TLV of the first LLDP packet includes the authentication TLV and a minimum security level TLV, and the minimum security level TLV includes: an End of LLDPDU TLV, a Chassis ID TLV, a Port ID TLV, and a Time to Live TLV.

In specific implementation, when the first network device determines that the security level of the second network device is secure, the first network device identifies the second network device as a "secure neighbor"; or when the first network device determines that the security level of the second network device is insecure or a first LLDP packet sent by the second network device does not include an authentication TLV, the first network device identifies the second network device as an "insecure neighbor."

205: Determine whether the first LLDP packet carries a System Capabilities TLV, and if the first LLDP packet does not carry a System Capabilities TLV, execute 206, or if the first LLDP packet carries a System Capabilities TLV, execute 207.

The System Capabilities TLV includes four fields: TLV Type, TLV information string Length, System Capabilities, and Enabled Capabilities; the System Capabilities field is used to describe a device function. The System Capabilities field generally includes 16 bits, where each bit is used to indicate a function, when the bit is set to 1, it indicates that the function is provided, and when the bit is set to 0, it indicates that the function is not provided.

Specifically, the following separately describes the function indicated by each bit according to a sequence of these 16 bits: 0. Other, 1. Repeater, 2. Bridge, 3. Wlan-Access-Point (a wireless hotspot), 4. Router, 5. Telephone, 6. DOCSIS cable device (Data Over Cable Service Interface Specification cable device), 7. Station Only (station), 8. C_Vlan Component of a Vlan Bridge (Customer Vlan Component of a Vlan Bridge, user virtual local area network component), 9. S_Vlan Component of a Vlan Bridge (Stack Vlan Component of a Vlan Bridge, exchange virtual local area network component), 10. Two-Port-MAC Relay (two port bridging), 11-15. reserved. Each of the foregoing functions is corresponding to a device type. Therefore, the device type can be determined by checking values of the foregoing 16 bits.

206: The first network device sends a second LLDP packet to the second network device, where a TLV in the second LLDP packet includes all types of TLVs. Specifically, all types of TLVs include: a Chassis ID TLV, a Port ID TLV, a Time to Live TLV, an End of LLDPDU TLV, a Port Description TLV, a System Name TLV, a System Description TLV, a System Capabilities TLV, a Management Address TLV, a Port VLAN ID (Port Virtual Local Area Network Identifier) TLV, a Port And Protocol VLAN ID (Port And Protocol Virtual Local Area Network Identifier) TLV, a VLAN Name (virtual local area network name) TLV, a Protocol Identifier TLV, a MAC/PHY Configuration/Status (data link and physical layer configuration and status) TLV, a Power Via MDI (power supply capability of port) TLV, a Link Aggregation TLV, a Maximum Frame Size (maximum frame length) TLV, an LLDP-MED Capabilities (LLDP-Media Endpoint Discovery Capabilities, media endpoint discovery type which can be encapsulated in the LLDP) TLV, a Network Policy (an application policy) TLV, an Extended Power-via-MDI (a device power supply capability) TLV, a Hardware Revision TLV, a Firmware Revision TLV, a Software Revision TLV, a Serial Number (a device serial number) TLV, a Manufacturer Name (a manufacturer) TLV, a Model Name (a drive name) TLV, an Asset ID (a device assertion identifier) TLV, a Location Identification (location identification) TLV, and a custom TLV.

207: Acquire, according to the System Capabilities field in the System Capabilities TLV, a function provided by the second network device, determine a device type of the second network device according to the function provided by the second network device, and execute 208.

The device type includes but is not limited to a repeater, a telephone (for example, an Internet protocol telephone), a bridge, a router, and the like. A basis of the determining is the device function described in the System Capabilities field in the System Capabilities TLV, for example, when the device type is a repeater, a telephone, a bridge, and a router, a value respectively corresponding to the first, the fifth, the second, and the fourth bits in the System Capabilities field is 1.

208: Send a second LLDP packet to the second network device according to the device type of the second network device, where the second LLDP packet includes a TLV corresponding to the device type of the second network device.

The foregoing sending the second LLDP packet corresponding to the device type to the second network device according to the device type is mainly determined according to the following two points:

1. A processing capability of a device. For example, the second network device is a low-end device, and has a quite low processing capability. The LLDP packet is rich in content, and uses an encryption manner. Consequently, the device cannot operate normally.

2. Which TLVs in the LLDP packet are required by the device. For example, for an IP (Internet Protocol, IP for short) telephone, information such as a port power supply capability and a VOICE VLAN (Virtual Local Area Network) is required, and information about a Link Aggregation TLV is not required.

Specifically, 208 may include the following:

If the second network device is a repeater, sending the second LLDP packet to the second network device, where the TLV in the second LLDP packet includes only the minimum security level TLV; and the minimum security level TLV includes: a Chassis ID TLV, a Port ID TLV, a Time to Live TLV, and an End of LLDPDU TLV.

If the second network device is a bridge or a router, sending the second LLDP packet to the second network device, where the TLV in the second LLDP packet includes all types of TLVs; specifically, all types of TLVs include: a Chassis ID TLV, a Port ID TLV, a Time to Live TLV, an End of LLDPDU TLV, a Port Description TLV, a System Name TLV, a System Description TLV, a System Capabilities TLV, a Management Address TLV, a Port VLAN ID TLV, a Port And Protocol VLAN ID TLV, a VLAN Name TLV, a Protocol Identifier TLV, a MAC/PHY Configuration/Status TLV, a Power Via MDI TLV, a Link Aggregation TLV, a Maximum Frame Size TLV, an LLDP-MED Capabilities TLV, a Network Policy TLV, an Extended Power-via-MDI TLV, a Hardware Revision TLV, a Firmware Revision TLV, a Software Revision TLV, a Serial Number TLV, a Manufacturer Name TLV, a Model Name TLV, an Asset ID TLV, a Location Identification TLV, and a custom TLV.

If the second network device is an Internet protocol telephone, sending the second LLDP packet to the second network device, where the TLV in the second LLDP packet includes the minimum security level TLV, a Port Description TLV, a System Name TLV, a System Description TLV, a System Capabilities TLV, a Port VLAN ID TLV, and an Extended Power-via-MDI TLV. The minimum security level TLV includes: a Chassis ID TLV, a Port ID TLV, a Time to Live TLV, and an End of LLDPDU TLV.

In specific implementation, a correspondence between a device type and a TLV may be prestored in a network device. It can be easily learnt that the foregoing correspondence may be further classified according to the device type, and details are not repeatedly described herein.

Optionally, before the sending the second LLDP packet to the second network device according to the device type of the second network device, the method further includes: encrypting the TLV in the second LLDP packet by using a reversible algorithm. Specifically, a value of the TLV in the second LLDP packet is encrypted by using the reversible algorithm. It can be easily learnt that the reversible algorithm may be written into a device when the manufacturer produces the device.

In addition, after receiving the first LLDP packet, the first network device may further store a correspondence between a port of the first network device and a directly connected device, a security level and device information of the directly connected device, and the like. The correspondence is generally stored in a MIB of the device.

Optionally, the method in this embodiment may further include:

when a quantity of directly connected devices connected to one port of the first network device reaches an upper limit, and a security level of a directly connected device that is newly accessed on the port is secure, deleting at least one directly connected device connected to the port, where a security level of the at least one directly connected device is insecure. It can be easily learnt that, when the quantity of directly connected devices connected to one port of the first network device reaches an upper limit, and it is determined that the security level of the directly connected device that is newly accessed is insecure, a directly connected device, with a security level being insecure, connected to the port is not deleted.

Specifically, the deleting a directly connected device, with a security level being insecure, connected to the port includes:

deleting the directly connected device with the security level being insecure from the stored correspondence between a port and a directly connected device.

In this way, a neighbor priority is actually controlled. A priority of a directly connected device with a security level being insecure is lower than that of a directly connected device with a security level being secure, which not only ensures a compatibility with a directly connected device with a security level being insecure, and avoids a problem that a directly connected device with a security level being insecure exhausts a quantity of neighbors. The deleting at least one directly connected device with a security level being insecure ensures access of a new directly connected device with a security level being secure.

In this embodiment of the present application, a security level of a directly connected device is determined by using an authentication TLV. In one aspect, when the security level of the directly connected device is secure, a device type of the directly connected device is determined, and a TLV corresponding to the device type is selected according to the device type and sent, which avoids that all types of TLVs are sent to a directly connected device every time in the prior art, and reduces a possibility of device information leakage. It is ensured that a sent LLDP packet is more proper, thereby reducing a link overhead and avoiding a problem that a directly connected device cannot perform processing and consequently cannot operate normally. In another aspect, when the security level of the directly connected device is insecure or the LLDP packet sent by the directly connected device does not carry an authentication TLV, an LLDP packet including only a minimum security level TLV is sent, which can meet a security requirement and also ensure normal access of a low-end device and an old device.

Embodiment 3

Figure 7:
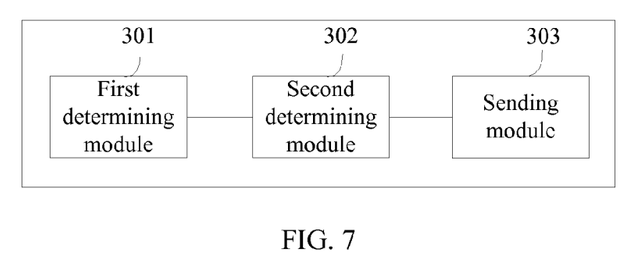
FIG. 7 is a schematic structural diagram of a link discovery apparatus according to Embodiment 3 of the present application.

Referring to FIG. 7, the embodiment of the present application provides a link discovery apparatus. The apparatus is applicable to the link discovery method provided by Embodiment 1. The apparatus includes:

a first determining module 301, configured to: when a received LLDP packet sent by a directly connected device is a first LLDP packet, determine a security level of the directly connected device according to an authentication TLV in the first LLDP packet, where the security level includes "secure" and "insecure", the first LLDP packet includes an authentication TLV and a minimum security level TLV, and the minimum security level TLV includes: a Chassis ID TLV, a Port ID TLV, a Time to Live TLV, and an End of LLDPDU TLV;

a second determining module 302, configured to: when the first determining module 301 determines that the security level of the directly connected device is secure, determine a device type of the directly connected device according to the first LLDP packet; and a sending module 303, configured to send a second LLDP packet to the directly connected device according to the device type of the directly connected device, where the second LLDP packet includes a TLV corresponding to the device type of the directly connected device.

In this embodiment of the present application, when a security level of a directly connected device is secure, a device type of the directly connected device is determined, and a TLV corresponding to the device type is selected according to the device type and sent, which avoids that all types of TLVs are sent to a directly connected device every time in the prior art, and reduces a possibility of device information leakage. It is ensured that a sent LLDP packet is more proper, thereby reducing a link overhead and avoiding a problem that a directly connected device cannot perform processing and consequently cannot operate normally.

Embodiment 4

Figure 8:
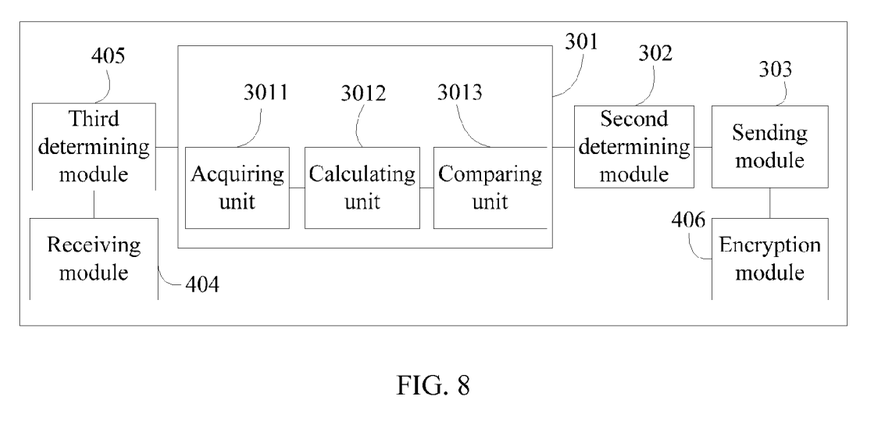
FIG. 8 is a schematic structural diagram of a link discovery apparatus according to Embodiment 4 of the present application.

Referring to FIG. 8, this embodiment of the present application provides a link discovery apparatus. The apparatus is applicable to the link discovery method provided by Embodiment 2. The apparatus includes:

a first determining module 301, a second determining module 302, and a sending module 303.

Further, the sending module 303 is further configured to: when a security level of a directly connected device is insecure, send a first LLDP packet to the directly connected device, where a TLV in the first LLDP packet includes an authentication TLV and a minimum security level TLV.

Further, the apparatus further includes:

a receiving module 404, configured to receive an LLDP packet sent by the directly connected device; and a third determining module 405, configured to determine whether the received LLDP packet carries an authentication TLV, and when the LLDP packet carries an authentication TLV, determine that the LLDP packet is the first LLDP packet.

Correspondingly, the sending module 303 is further configured to send the first LLDP packet to the directly connected device when the LLDP packet does not carry an authentication TLV.

The first determining module 301 includes:

an acquiring unit 3011, configured to obtain a Chassis ID and a Port ID of a directly connected device according to a Chassis ID TLV and a Port ID TLV;

a calculating unit 3012, configured to calculate a determining TLV by using the Chassis ID and the Port ID; and a comparing unit 3013, configured to determine, by comparing, whether the determining TLV and the authentication TLV are the same, and if the determining TLV and the authentication TLV are the same, determine that the security level of the directly connected device is secure, or if the determining TLV and the authentication TLV are different, determine that the security level of the directly connected device is insecure.

Further, the first LLDP packet further includes a System Capabilities TLV, and the second determining module 302 is configured to acquire, according to a System Capabilities field in the System Capabilities TLV, a function provided by the directly connected device, and determine a device type of the directly connected device according to the function provided by the directly connected device.

The device type includes a repeater, a telephone (for example, an Internet protocol telephone), a bridge, a router, and the like.

Further, the second determining module 302 is further configured to: before determining the device type of the directly connected device according to the first LLDP packet, determine whether the first LLDP packet carries a System Capabilities TLV, and when the first LLDP packet carries a System Capabilities TLV, determine the device type of the directly connected device according to the System Capabilities TLV.

Correspondingly, the sending module 303 is further configured to: when the first LLDP packet does not carry a System Capabilities TLV, send a second LLDP packet to the directly connected device, where a TLV in the second LLDP packet includes all types of TLVs.

Further, the sending module 303 is configured to:

when the directly connected device is a repeater, send the second LLDP packet to the directly connected device, where the TLV in the second LLDP packet includes only the minimum security level TLV;

when the directly connected device is a bridge or a router, send the second LLDP packet to the directly connected device, where the TLV in the second LLDP packet includes all types of TLVs; or when the directly connected device is an Internet protocol telephone, send the second LLDP packet to the directly connected device, where the TLV in the second LLDP packet includes the minimum security level TLV, a Port Description TLV, a System Name TLV, a System Description TLV, a System Capabilities TLV, a port virtual local area network identifier TLV, and a device power supply capability TLV.

Further, the apparatus further includes an encryption module 406, configured to encrypt the TLV in the second LLDP packet by using a reversible algorithm.

Further, the apparatus further includes a management module, configured to: when a quantity of directly connected devices connected to one port of a network device reaches an upper limit, and a security level of a directly connected device that is newly accessed on the port is secure, delete at least one directly connected device connected to the port, where a security level of the at least one directly connected device is insecure.

In this embodiment of the present application, a security level of a directly connected device is determined by using an authentication TLV. In one aspect, when the security level of the directly connected device is secure, a device type of the directly connected device is determined, and a TLV corresponding to the device type is selected according to the device type and sent, which avoids that all types of TLVs are sent to a directly connected device every time in the prior art, and reduces a possibility of device information leakage. It is ensured that a sent LLDP packet is more proper, thereby reducing a link overhead and avoiding a problem that a directly connected device cannot perform processing and consequently cannot operate normally. In another aspect, when the security level of the directly connected device is insecure or the LLDP packet sent by the directly connected device does not carry an authentication TLV, an LLDP packet including only a minimum security level TLV is sent, which can meet a security requirement and also ensure normal access of a low-end device and an old device.

Figure 9:
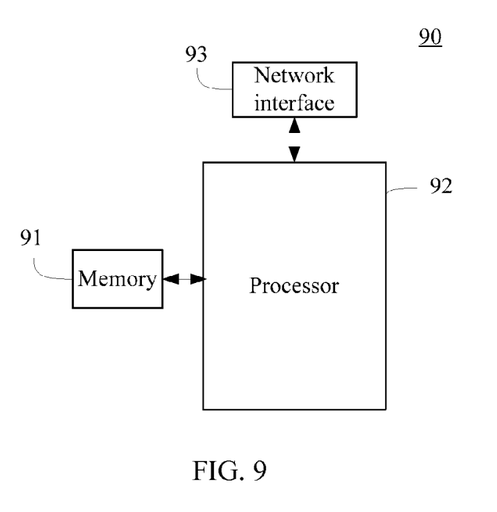
FIG. 9 is a schematic structural diagram of a specific implementation manner of the link discovery apparatus according to Embodiments 3 and 4 of the present application.

In a specific implementation manner, the foregoing link discovery apparatus FIG. 7 and FIG. 8 may be a computer or a server, as shown in FIG. 9. The link discovery apparatus generally includes components such as a memory 91, a processor 92, and a network interface 93. A person skilled in the art may understand that a structure shown in FIG. 9 does not impose any limitation on the apparatus, and the apparatus may include more or fewer components than those shown in the figure, or some components may be combined, or different components may be deployed.

The following describes component parts of a computer 90 in detail with reference to FIG. 9:

The memory 91 may be used to store software programs and application modules, and the processor 92 runs the software programs and the application modules stored in the memory 91 to execute various function applications of the computer 90 and perform data processing. The memory 91 may mainly include a program storage area and a data storage area. The program storage area may store an operating system, an application program required by at least one function (for example, packet decapsulation), and so on. The data storage area may store data created according to processing of the computer 90. In addition, the memory 91 may include a high-speed RAM (Random Access Memory), and may further include a non-volatile memory (non-volatile memory), for example, at least one disk memory device, a flash memory device, or another volatile solid-state memory device.

The processor 92 is a control center of the computer 90, and connects parts of the entire computer by using various interfaces and lines.

Specifically, by running or executing the software programs and/or application modules stored in the memory 91, and invoking data stored in the memory 91, the processor 92 may implement the following: when an LLDP packet received by the network interface 93 and sent by a directly connected device is a first LLDP packet, determining a security level of the directly connected device according to an authentication TLV in the first LLDP packet, where the security level includes "secure" and "insecure", the first LLDP packet includes the authentication TLV and a minimum security level TLV, and the minimum security level TLV includes: a Chassis ID TLV, a Port ID TLV, a Time to Live TLV, and an End of LLDPDU TLV; and when the security level of the directly connected device is secure, determining a device type of the directly connected device according to the first LLDP packet; and sending a second LLDP packet by using the network interface 93 to the directly connected device according to the device type of the directly connected device, where the second LLDP packet includes a TLV corresponding to the device type of the directly connected device.

Further, the network interface 93 is further configured to: when the security level of a directly connected device is insecure, send the first LLDP packet to the directly connected device, where a TLV in the first LLDP packet includes an authentication TLV and a minimum security level TLV.

Further, the processor 92 may implement the following: receiving, by using the network interface 93, an LLDP packet sent by the directly connected device, and determining whether the received LLDP packet carries an authentication TLV; and if the LLDP packet carries an authentication TLV, the LLDP packet is the first LLDP packet; or if the LLDP packet does not carry an authentication TLV, sending the first LLDP packet to the directly connected device by using the network interface 93.

Further, the processor 92 may implement the following: obtaining a Chassis ID and a Port ID according to the Chassis ID TLV and the Port ID TLV that are carried in the first LLDP packet sent by the directly connected device;

calculating a determining TLV by using the Chassis ID and the Port ID; and determining, by comparing, whether the determining TLV and the authentication TLV are the same, and if the determining TLV and the authentication TLV are the same, determining that the security level of the directly connected device is secure, or if the determining TLV and the authentication TLV are different, determining that the security level of the directly connected device is insecure.

Further, the processor 92 may implement the following: acquiring, according to a System Capabilities field in a System Capabilities TLV, a function provided by the directly connected device, and determining the device type of the directly connected device according to the function provided by the directly connected device.

Further, the processor 92 may implement the following: before determining the device type of the directly connected device according to the first LLDP packet, determining whether the first LLDP packet carries a System Capabilities TLV; and when the first LLDP packet carries a System Capabilities TLV, determining the device type of the directly connected device according to the System Capabilities TLV; or when the first LLDP packet does not carry a System Capabilities TLV, sending the second LLDP packet to the directly connected device by using the network interface 93, where the TLV in the second LLDP packet includes all types of TLVs.

Further, the processor 92 may implement the following: when the directly connected device is a repeater, sending the second LLDP packet to the directly connected device by using the network interface 93, where the TLV in the second LLDP packet includes only the minimum security level TLV;

when the directly connected device is a bridge or a router, sending the second LLDP packet to the directly connected device by using the network interface 93, where the TLV in the second LLDP packet includes all types of TLVs; or when the directly connected device is an Internet protocol telephone, sending the second LLDP packet to the directly connected device by using the network interface 93, where the TLV in the second LLDP packet includes the minimum security level TLV, a Port Description TLV, a System Name TLV, a System Description TLV, a System Capabilities TLV, a port virtual local area network identifier TLV, and a device power supply capability TLV.

Further, the processor 92 may further implement the following: encrypting, by using a reversible algorithm, the TLV carried in the second LLDP packet.

Further, the processor 92 may implement the following: when a quantity of directly connected devices connected to one port of a network device reaches an upper limit, and a security level of a directly connected device that is newly accessed on the port is secure, deleting at least one directly connected device connected to the port, where a security level of the at least one directly connected device is insecure.

It should be noted that: when the link discovery apparatus provided in the foregoing embodiment performs link discovery, division of the foregoing function modules is used merely as an example for description. In an actual application, the foregoing functions may be allocated, according to a requirement, to different function modules for implementation, that is, an internal structure of the link discovery apparatus is divided into different function modules to implement all or a part of the functions described above. In addition, the link discovery apparatus provided in the foregoing embodiments is based on the same conception of the link discovery method embodiments. For a specific implementation process of the link discovery apparatus, refer to the method embodiments, and details are not repeatedly described herein.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A link discovery method, comprising:
   in response to a network device receiving a first Link Layer Discovery Protocol (LLDP) packet sent by a directly connected device, determining a security level of the directly connected device according to an authentication type-length-value (TLV) in the first LLDP packet, the security level comprises either a secure security level or an insecure security level, wherein the first LLDP packet comprises the authentication TLV and a minimum security level TLV, and the minimum security level TLV comprises a Chassis ID TLV, a Port ID TLV, a Time to Live TLV, and an End of LLDP Data Unit TLV; and
   in response to determining that the security level of the directly connected device is the secure security level, determining a device type of the directly connected device according to the first LLDP packet, and sending a second LLDP packet to the directly connected device according to the device type of the directly connected device, wherein the second LLDP packet comprises a TLV corresponding to the device type of the directly connected device,
   wherein the sending a second LLDP packet to the directly connected device according to the device type of the directly connected device comprises:
   when the directly connected device is a repeater, sending the second LLDP packet to the directly connected device, wherein the TLV in the second LLDP packet comprises only the minimum security level TLV; or
   when the directly connected device is a bridge or a router, sending the second LLDP packet to the directly connected device, wherein the TLV in the second LLDP packet comprises all types of TLVs; or
   when the directly connected device is an Internet Protocol (IP) telephone, sending the second LLDP packet to the directly connected device, wherein the TLV in the second LLDP packet comprises the minimum security level TLV, a Port Description TLV, a System Name TLV, a System Description TLV, a System Capabilities TLV, a port virtual local area network identifier TLV, and a device power supply capability TLV.

2. The method according to claim 1, wherein before the determining the security level of the directly connected device according to the authentication TLV in the first LLDP packet, the method further comprises:

receiving an LLDP packet sent by the directly connected device, and determining whether the received LLDP packet carries an authentication TLV, wherein if the LLDP packet carries an authentication TLV, then the LLDP packet is the first LLDP packet.

3. The method according to claim 1, wherein the determining the security level of the directly connected device according to the authentication TLV in the first LLDP packet comprises:

obtaining a chassis identifier and a port identifier of the directly connected device according to the Chassis ID TLV and the Port ID TLV;

calculating a determining TLV based on the chassis identifier and the port identifier; and determining, by comparing, whether the determining TLV and the authentication TLV are the same, wherein if the determining TLV and the authentication TLV are the same, determining that the security level of the directly connected device is the secure security level; and, if the determining TLV and the authentication TLV are different, determining that the security level of the directly connected device is the insecure security level.

4. The method according to claim 1, wherein the first LLDP packet further comprises a System Capabilities TLV, wherein the System Capabilities TLV comprises a system capabilities field used to describe a device function, and the determining the device type of the directly connected device according to the first LLDP packet comprises:

acquiring, according to the system capabilities field in the System Capabilities TLV, a function provided by the directly connected device; and determining the device type of the directly connected device according to the function provided by the directly connected device.

5. The method according to claim 1, wherein before the sending a second LLDP packet to the directly connected device according to the device type of the directly connected device, the method further comprises:

encrypting the TLV in the second LLDP packet by using a reversible algorithm.

6. The method according to claim 1, further comprising:

when a quantity of directly connected devices connected to one port of the network device reaches an upper limit, and a security level of a directly connected device that is newly accessed on the port is secure, deleting at least one directly connected device connected to the port, wherein a security level of the at least one directly connected device is insecure.

7. A link discovery method, comprising:

in response to a network device receiving a first Link Layer Discovery Protocol (LLDP) packet sent by a directly connected device, determining a security level of the directly connected device according to an authentication type-length-value (TLV) in the first LLDP packet, the security level comprises either a secure security level or an insecure security level, wherein the first LLDP packet comprises the authentication TLV and a minimum security level TLV, and the minimum security level TLV comprises a Chassis ID TLV, a Port ID TLV, a Time to Live TLV, and an End of LLDP Data Unit TLV; and in response to determining that the security level of the directly connected device is the secure security level, determining a device type of the directly connected device according to the first LLDP packet, and sending a second LLDP packet to the directly connected device according to the device type of the directly connected device, wherein the second LLDP packet comprises a TLV corresponding to the device type of the directly connected device, wherein the first LLDP packet further comprises a System Capabilities TLV, wherein the System Capabilities TLV comprises a system capabilities field used to describe a device function, and the determining the device type of the directly connected device according to the first LLDP packet comprises:

acquiring, according to the system capabilities field in the System Capabilities TLV, a function provided by the directly connected device; and determining the device type of the directly connected device according to the function provided by the directly connected device, wherein before the determining the device type of the directly connected device according to the first LLDP packet, the method further comprises:

determining whether the first LLDP packet carries the System Capabilities TLV; and wherein the sending a second LLDP packet to the directly connected device according to the device type of the directly connected device comprises:

when the first LLDP packet does not carry the System Capabilities TLV, sending the second LLDP packet to the directly connected device, wherein the TLV in the second LLDP packet comprises all types of TLVs; or when the first LLDP packet carries the System Capabilities TLV, determining the device type of the directly connected device according to the System Capabilities TLV.

8. A link discovery apparatus, comprising:

a non-transitory computer-readable storage medium storing a program; and a processor configured to execute the program to cause the apparatus to:

in response to a network device receiving a first Link Layer Discovery Protocol (LLDP) packet sent by a directly connected device, determine a security level of the directly connected device according to an authentication type-length-value (TLV) in the first LLDP packet, wherein the security level comprises either a secure security level or an insecure security level, wherein the first LLDP packet comprises the authentication TLV and a minimum security level TLV, and the minimum security level TLV comprises a Chassis ID TLV, a Port ID TLV, a Time to Live TLV, and an End of LLDP Data Unit TLV;

determining that the security level of the directly connected device is the secure security level, determine a device type of the directly connected device according to the first LLDP packet; and send a second LLDP packet to the directly connected device according to the device type of the directly connected device, wherein the second LLDP packet comprises a TLV corresponding to the device type of the directly connected device, wherein the processor is further configured to execute the program to cause the apparatus to:
when the directly connected device is a repeater, send the second LLDP packet to the directly connected device, wherein the TLV in the second LLDP packet comprises only the minimum security level TLV; or
when the directly connected device is a bridge or a router, send the second LLDP packet to the directly connected device, wherein the TLV in the second LLDP packet comprises all types of TLVs; or
when the directly connected device is an Internet Protocol (IP) telephone, send the second LLDP packet to the directly connected device, wherein the TLV in the second LLDP packet comprises the minimum security level TLV, a Port Description TLV, a System Name TLV, a System Description TLV, a System Capabilities TLV, a port virtual local area network identifier TLV, and a device power supply capability TLV.

9. The apparatus according to claim 8, wherein, before the determining the security level of the directly connected device according to the authentication TLV in the first LLDP packet, the processor is further configured to execute the program to cause the apparatus to:
receive an LLDP packet sent by the directly connected device; and
determine whether the LLDP packet received by the receiving module carries an authentication TLV,
wherein when the LLDP packet carries an authentication TLV, determine that the LLDP packet is the first LLDP packet.

10. The apparatus according to claim 8, wherein the processor is further configured to execute the program to cause the apparatus to:
obtain a chassis identifier and a port identifier of the directly connected device according to the Chassis ID TLV and the Port ID TLV;
calculate a determining TLV by using the chassis identifier and the port identifier; and
determine, by comparing, whether the determining TLV and the authentication TLV are the same,
wherein if the determining TLV and the authentication TLV are the same, determine that the security level of the directly connected device is secure; or
wherein if the determining TLV and the authentication TLV are different, determine that the security level of the directly connected device is insecure.

11. The apparatus according to claim 8, wherein the first LLDP packet further comprises a System Capabilities TLV, wherein the System Capabilities TLV comprises a system capabilities field used to describe a device function, and
acquire, according to the system capabilities field in the System Capabilities TLV, a function provided by the directly connected device, and determine the device type of the directly connected device according to the function provided by the directly connected device.

12. The apparatus according to claim 8, wherein the processor is further configured to execute the program to cause the apparatus to:
encrypt the TLV in the second LLDP packet by using a reversible algorithm.

13. The apparatus according to claim 8, wherein the processor is further configured to execute the program to cause the apparatus to:
when a quantity of directly connected devices connected to one port of the network device reaches an upper limit, and a security level of a directly connected device that is newly accessed on the port is secure, delete at least one directly connected device connected to the port, wherein a security level of the at least one directly connected device is insecure.

14. A link discovery apparatus, comprising:
a non-transitory computer-readable storage medium storing a program; and
a processor configured to execute the program to cause the apparatus to:
in response to a network device receiving a first Link Layer Discovery Protocol (LLDP) packet sent by a directly connected device, determine a security level of the directly connected device according to an authentication type-length-value (TLV) in the first LLDP packet, wherein the security level comprises either a secure security level or an insecure security level, wherein the first LLDP packet comprises the authentication TLV and a minimum security level TLV, and the minimum security level TLV comprises a Chassis ID TLV, a Port ID TLV, a Time to Live TLV, and an End of LLDP Data Unit TLV;
in response to determining that the security level of the directly connected device is the secure security level, determine a device type of the directly connected device according to the first LLDP packet; and
send a second LLDP packet to the directly connected device according to the device type of the directly connected device, wherein the second LLDP packet comprises a TLV corresponding to the device type of the directly connected device wherein the first LLDP packet further comprises a System Capabilities TLV, wherein the System Capabilities TLV comprises a system capabilities field used to describe a device function, and
acquire, according to the system capabilities field in the System Capabilities TLV, a function provided by the directly connected device, and determine the device type of the directly connected device according to the function provided by the directly connected device, wherein the processor is further configured to execute the program to cause the apparatus to:
before the determining the device type of the directly connected device according to the first LLDP packet, determine whether the first LLDP packet carries the System Capabilities TLV;
wherein when the first LLDP packet carries the System Capabilities TLV, determine the device type of the directly connected device according to the System Capabilities TLV, or
wherein when the first LLDP packet does not carry the System Capabilities TLV, the sending module is further configured to send the second LLDP packet to the directly connected device, wherein the TLV in the second LLDP packet comprises all types of TLVs.

* * * * *